United States Patent [19]

Assh

[11] Patent Number: 5,024,462
[45] Date of Patent: Jun. 18, 1991

[54] COMBINED AIR AND LEAF SPRING SUSPENSION FOR HEAVY WEIGHT VEHICLE

[76] Inventor: Daniel Assh, 1155 Turnball, Apt. 715, Quebec, Canada, G1R 5G3

[21] Appl. No.: 349,107

[22] Filed: May 9, 1989

[51] Int. Cl.$^5$ .................. B60G 11/38; B60G 11/42
[52] U.S. Cl. ........................ 280/712; 280/710; 280/718; 267/241
[58] Field of Search ............ 280/697, 712, 710, 718; 267/31, 32, 54 C, 699, 712, 715, 716, 718, 30, 36.1, 269, 152, 241

[56] References Cited

U.S. PATENT DOCUMENTS

| | | | |
|---|---|---|---|
| 2,659,595 | 11/1953 | Coda | 267/30 |
| 2,991,993 | 7/1961 | Harbers et al. | 267/269 |
| 3,069,149 | 12/1962 | Neff | 280/715 |
| 3,137,488 | 6/1964 | Toyer | 267/269 |
| 3,175,819 | 3/1965 | Moreno et al. | 267/710 |
| 3,497,235 | 2/1970 | Peer | 280/710 |
| 3,642,302 | 2/1972 | Hickman | 280/710 |
| 3,690,693 | 9/1972 | Myers | 280/710 |
| 3,799,571 | 3/1974 | Sudberry | 280/715 |
| 3,860,256 | 1/1975 | Jackson et al. | 280/710 |
| 3,895,819 | 7/1975 | Willetts | 280/715 |
| 3,933,367 | 1/1976 | Tamas | 267/269 |
| 4,175,772 | 11/1979 | Lampert | 280/718 |
| 4,580,798 | 4/1986 | Roelofs | 280/712 |
| 4,643,447 | 2/1987 | Rogers | 280/712 |
| 4,678,204 | 7/1987 | Hetherington | 280/710 |
| 4,822,007 | 4/1989 | Rogers | 280/712 |

FOREIGN PATENT DOCUMENTS

| | | | |
|---|---|---|---|
| 974921 | 5/1961 | Fed. Rep. of Germany | 280/715 |
| 430213 | 2/1948 | Italy | 280/715 |

*Primary Examiner*—Richard A. Bertsch
*Attorney, Agent, or Firm*—Foley & Lardner

[57] ABSTRACT

A shock-absorbing suspension for a road vehicle, having a body, comprises a leaf spring of which one end is connected to the vehicle body for pivotal movement of the spring about a first axis extending transversely of the body. The other end of the spring has a load and shock transmitting lever. The latter is mounted at one end for pivotal movement about a second axis parallel to the first one which its other end has a pneumatic balloon which is solid with it while being solid also with the vehicle frame. There is provided, on this lever and in cooperation with the other end of the leaf spring, a connection which is capable of transferring loads and shocks from the leaf spring to the lever.

14 Claims, 3 Drawing Sheets

5,024,462

COMBINED AIR AND LEAF SPRING SUSPENSION FOR HEAVY WEIGHT VEHICLE

BACKGROUND OF THE INVENTION

1. Field of the Invention

The present invention relates to an improved shock-absorbing suspension for a road vehicle, particularly of the heavy-weight type, which suspension combines the features of both air and leaf spring suspensions.

2. Description of the Prior Art

It is known that leaf spring suspensions are particularly well suited to support heavy loads and, at low speed, to give the driver a good perception of the vehicle's behavior through the steering column. However, on rough terrain and/or when meeting pot-holes, the leaf spring suspension has a slow response so that the impact force to which the wheels are subjected is transmitted directly to the vehicle frame and body, jarring them as well as the vehicle's occupants. Such jarring may also damage the vehicle frame, the axle, the suspension as well as the cargo.

Air suspensions, using air-inflated balloons, have been developped for better shock absorption and have been found quite reliable and comfortable. Vehicle drivers complain, however, that they do not provide an adequate perception of the vehicle's behavior.

SUMMARY OF THE INVENTION

A main object of the invention is therefore to provide an improved shock-absorbing suspension capable of combining the advantageous features of leaf spring suspensions and air suspensions, as pointed out above, to provide safe and comfortable driving and riding regardless of the conditions of the road with respect, particularly, to roughness and pot-holes.

Another object of the invention is to provide an improved suspension of the above type, which allows the energy resulting from "big" shocks of high amplitude to be absorbed essentially by a leaf spring suspension while the energy resulting from small shocks of low amplitude is absorbed by an air-inflated balloon. Appropriately, then, the driver is able to sense easily the reaction of the vehicle to the road conditions at all times, yet the suspension prevents undue jolting of the vehicles body and thus of the occupants.

A further object of the invention is to provide an improved suspension of the above type, which may be incorporated into a vehicle structure as part of a sensor for use to weight the load applied on a given axle. Indeed, by connecting the air-inflated balloon of the suspension to a pressure transducer, it becomes possible to determine the weight of the load being carried while keeping this load suspended over a reliable, heavy duty leaf spring.

More specifically, the invention proposes a shock-absorbing suspension for a road vehicle having a body, which suspension comprises a spring means preferrably consisting of a leaf spring having one end connected to the vehicle body for pivotal movement about a first axis extending transversely of the body. The other end of the spring has a load and shock transmitting lever. The latter is mounted at one end for pivotal movement about a second axis parallel to the first one while its other end has a pneumatic balloon which is solid with it while being solid also with the vehicle frame. There is provided, on this lever and in cooperation with the other end of the leaf spring, a connection which is capable of transferring loads and shocks from the leaf spring to the lever. In a preferred embodiment, this connection is in the form of a load bearing member, such as a freely rotatable roller, provided on the lever and which allows a top leaf of the leaf spring to bear and slide freely on it. This load and shock transmitting lever may, for instance, be an inverted U-shaped strap having a web and side flanges; the roller being mounted on the side flanges while the pneumatic balloon is fast with the web. The top leaf of the spring then extends freely between the side flanges.

Alternatively, the connection may take the form of a shackle of which one end is mounted on the transmitting lever while the other end is mounted on the leaf spring, both of these ends being mounted for pivotal motion about axes, that are parallel to the second axis.

A search of the prior art has been made which has revealed the following U.S. Pat. Nos. proposing suspension structures different from the one described above:

3,175,819
3,497,235
3,642,302
3,690,693
3,860,256
4,678,204

A description now follows of a preferred embodiment of the invention with variants, having reference to the appended drawings.

DESCRIPTION OF THE PREFERRED EMBODIMENT

Figure 1:
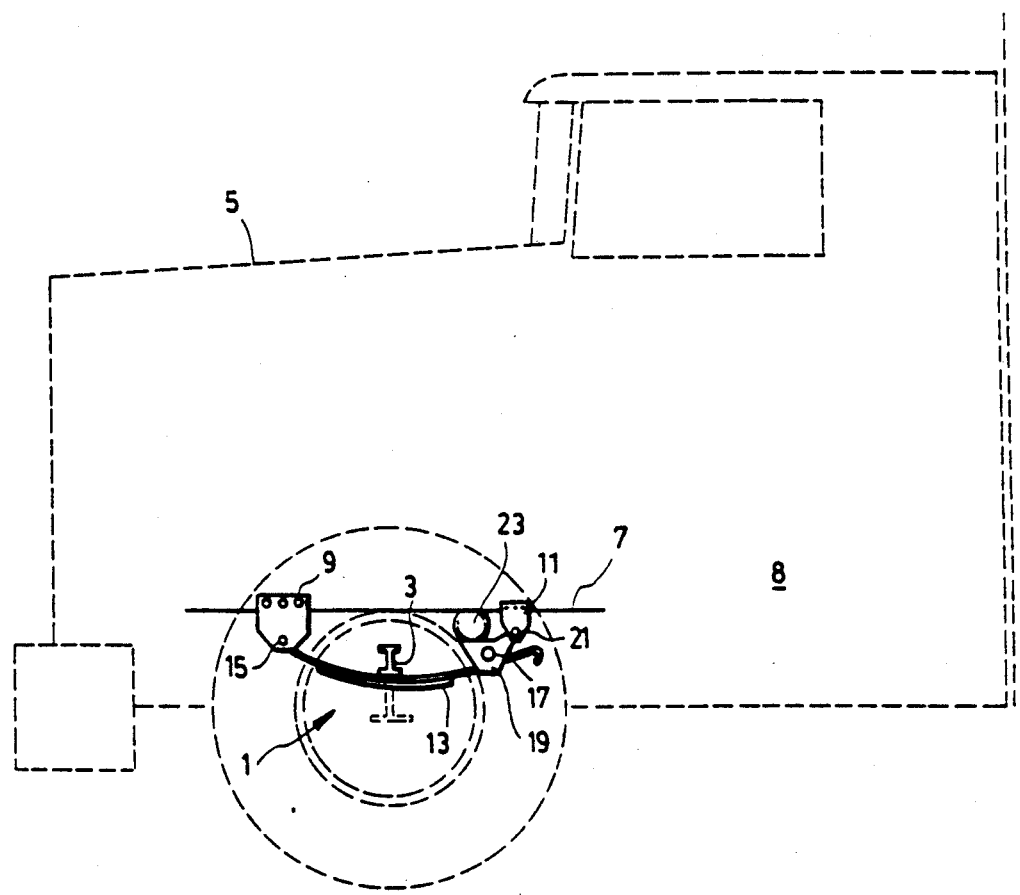
FIG. 1 is a side elevation view of a shock-absorbing suspension made according to the invention and seen as applied to the front wheel axle assembly of a motor vehicle.

Referring to FIGS. 1 to 4, the shock-absorbing suspension 1 is seen fixed on the front wheel axle assembly, represented here simply by a transverse axle beam 3, of a road vehicle 5. It is also fixed to a longitudinal frame member 7 of the body 8 of the vehicle by a pair of brackets 9 and 11 secured to the member 7. It further comprises a leaf spring 13 connected at one end to the bracket 9 by a pivot 15 so that it can swing about the axis of the pivot which extends transversely of the body 8. The other end of the spring 13 cooperates with a load-bearing member, here in the form of a freely rotatable roller 17 mounted on a load and shock transmitting lever 19 of which one end is connected to the bracket 11 by a pivot 21 so that it can swing about the transverse axis of the pivot. A pneumatic balloon 23 (shown here in cross section for convenience) is made solid with the frame member 7 and with the top of the lever 19. The roller 17 and the leaf 25 at the top of the leaf spring 13, bearing against the roller, constitute an assembly or means for transferring loads and shocks from the spring 13 to the lever 19 which, in turn, transmits them to the balloon 23.

Figure 3:
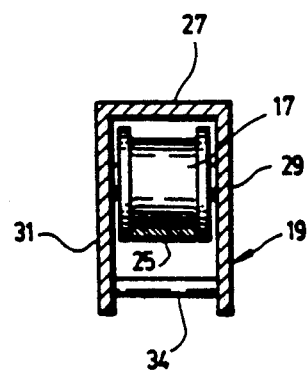
FIG. 3 is a cross-sectional view along line III—III of FIG. 2.

As shown in FIG. 3, the transmitting lever 19 is an inverted U-shaped strap having a web 27 and side flanges 29, 31; the roller 17 extending between the side flanges while the balloon 23 is secured to the web. As shown also, the top leaf 25 extends between the side flanges 29, 31 and bends down into a hook 33 at its free end. A stop pin 34 in secured to the side flanges 29, 31 at a distance from the roller 17 smaller than the length of the hook 33 so that the leaf spring 13 cannot disengage from the lever 19.

The pneumatic balloon 23 is formed as a spherical-like hollow body, made of resilient material such as sturdy rubber, having a flat top wall 35 made solid with the frame member 7, a flat bottom wall 37 made solid with the web 27 of the lever 19, and a resilient bulging sidewall 39, interconnecting the bottom and top walls and defining with them an inflatable chamber 41. A heavy frusto-conical shock-absorbing damper element 43 projects into the chamber 41, terminating short of the top wall 35 a distance acting as a stroke S of predetermined length.

With the above described suspension and with the vehicle encountering any substantial irregularity in the road such as pot-hoes, the damper element 43 quickly reaches the frame member 7 (through the bottom top wall 35) but is stiff enough so that the impact force from the wheel axle beam 3, due to the high amplitude jolt caused by irregularity in the road, can still be fully absorbed by the leaf spring 13 giving the driver a good appreciation of the vehicle's behavior. Simultaneously, deflections in the leaf spring 13 cause the top leaf 25 to slide over the roller 17; the hook 33 moving relative to the lever 19. When the vehicle encounters small irregularities in the road, the relatively stiff leaf spring 13 is also jolted, but, because of its slow action, the impact force is almost exclusively absorbed by the pneumatic balloon 23 so that the vehicle is subjected to relatively no jarring and yet the spring 13 still allows the driver to perceive the behavior of the vehicle reasonably well.

Figure 5:
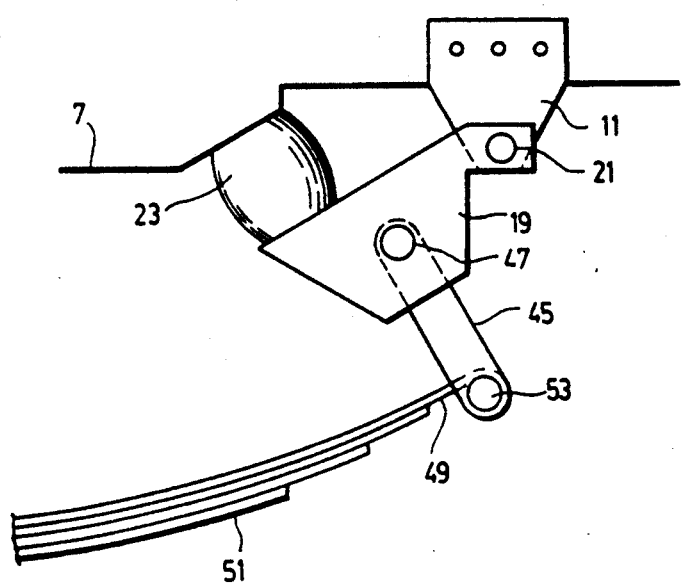
FIG. 5 (first page of drawings) is a partial side view of a variant.
Figure 2:
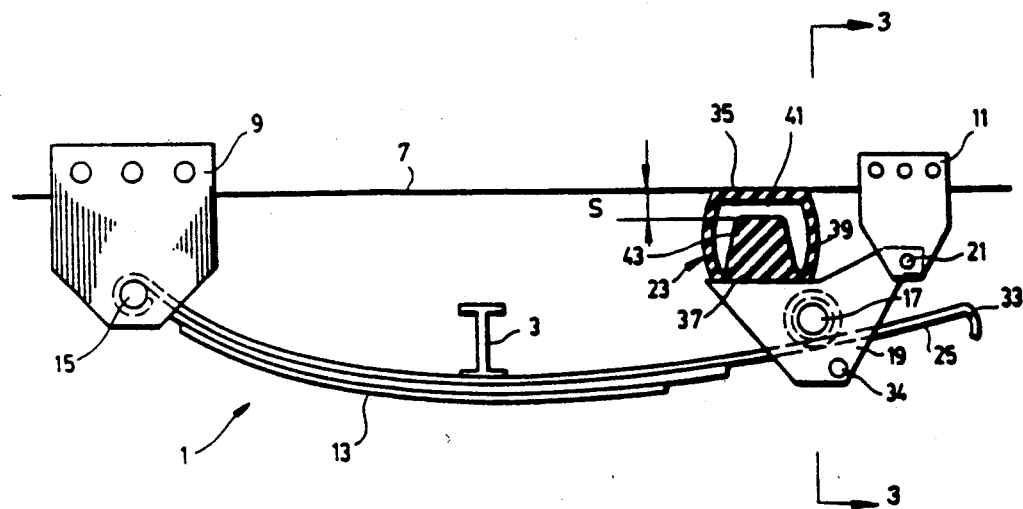
FIG. 2 is a view similar to that of FIG. 1, but on a larger scale.
Figure 4:
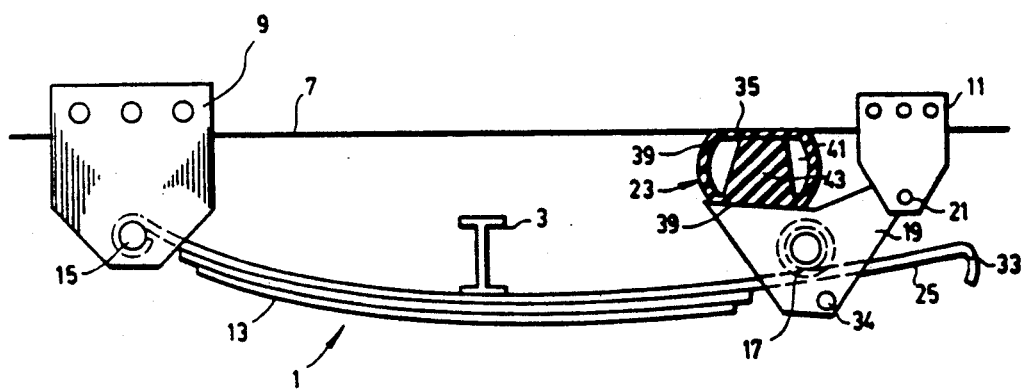
FIG. 4 is a view like that in FIG. 2 where the suspension is jolted by an irregularity of the road.

FIG. 5 shows a variant in the load and shock transfer means which, in this case, is in the form of a conventional shackle 45 having one end mounted on the lever 19 through a pivot 47 and its other end connected to the top leaf 49 of the leaf spring 51 through a pivot 53; the end of the top leaf 49 then winding around the pivot 53. Both ends of the shackle pivot about parallel transverse axes. The remaining structure is essentially the same as that described above.

While the above description refers to a shock-absorbing suspension 1 on one side of a road vehicle, it is obvious that another identical suspension is provided on the other side, attached to the other end of the axle beam 3, except in the case where the suspension is exclusively used as part of a sensor to weight the load being carried by the axle. Indeed, in the latter case, only one balloon connected to a pressure tranducer is actually required, the load being exclusively suspensed on the leaf spring, the balloon only acting as "part" of the sensor.

Figure 6:
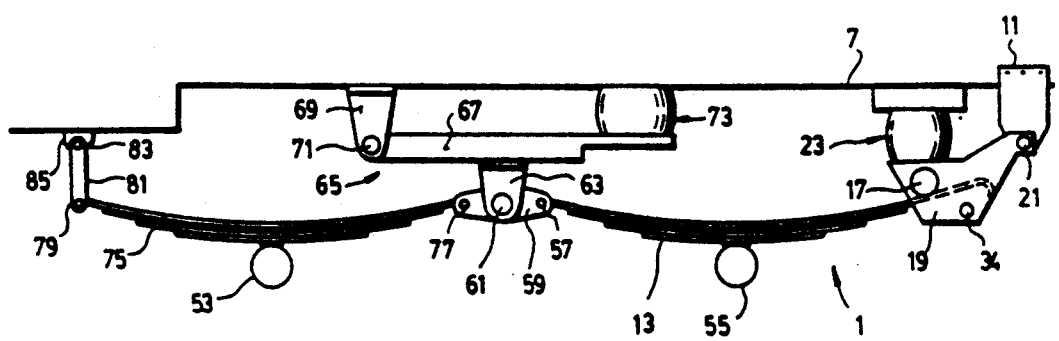
FIG. 6 is a side elevation view of another embodiment where the suspensions is applied to two wheel-axle assemblies.

Referring now to FIG. 6, the invention is seen as applied to a front wheel axle assembly represented here by an axle beam 53 and to a rear wheel axle assembly represented by an axle beam 55. It is seen that the suspension 1, as above described, is attached to the rear axle beam 55 with the rear end of its leaf spring 13 fitting loosely into the U-shaped lever 19 and butting against the roller 17; the lever being pivoted at one end to the bracket 11 and having a snubbing pneumatic balloon 23, at its other end, fixed to the frame member 7 of the vehicle. The other end of the spring is also mounted for pivotal movement about a transverse axis through a pivot 57 but the latter is that of a beam 59 capable of rocking by being pivoted, at 61, to a bracket 63 of a shock-absorbing assembly 65 depending from frame member 7.

The shock-absorbing assembly 65 comprises an arm 67 mounted at one end to the frame member 7 through a bracket 69 fixed to it; the arm being pivoted at 71. The other end of the arm 67 has an air-inflated balloon 73, similar to balloon 23, fixed both to the frame member 7 and to the said lever 67.

A second leaf spring 75, fixed to the front axle beam 53, has one end pivoted, at 77, to the other end of the rocking beam 59 while its other end is pivoted, at 79, to the lower end of a shackle 81 of which the other end is pivoted, at 83, to the frame member through a bracket 85. All pivot axes 57, 77, 79 and 83 are parallel to the rock axis 61.

With the above arrangement, when one or both axle beams 53, 55 are jolted, at low speed, the energy is absorbed wholly by the leaf springs 75 after the damper element 43 (FIG. 4) butts against the bottom walls 35 of the pneumatic balloons 73 and 23. Jolts at cruising speed are, however, absorbed mostly by the pneumatic balloons, in view of the relative stiffness and slow response of the leaf springs 13 and 73. The quick reaction of the pneumatic balloons thus prevents jolting of the vehicle body and of its occupants while the driver can still have an adequate perception of the behavior of the vehicle, as intended.

I claim:

1. A shock-absorbing suspension for a road vehicle having a body, said suspension comprising:
    a transverse wheel-axle beam;
    a leaf spring having a top spring leaf;
    means making said beam and said spring solid with one another;
    means connecting one end of said top spring leaf to the vehicle body for pivotal movement of said leaf spring about a first axis extending transversely of said vehicle body;
    a load and shock transmitting lever at the other end of said leaf spring;
    means mounting one end of said lever to the vehicle body for pivotal movement thereof about a second axis parallel to said first axis;
    a pneumatic balloon solid with the other end of said lever and with the vehicle body said pneumatic balloon comprising:
    (a) a hollow body having resilient sidewall means defining an air chamber;
    (b) a heavy shock-absorbing resilient damper element within said chamber, free from said sidewall means and solid with said transmitting lever; said damper element projecting up into said chamber and terminating short of the vehicle body to define therebetween a stroke of short predetermined length;
    (c) wherein both high amplitude jolting due to road irregularities, the top of said damper element butts against the vehicle body and vibrations in the leaf spring are absorbed essentially by said leaf spring whereas any low amplitude jolt is absorbed by said heavy damper element; and load and shock transfer means interconnecting said lever and said other end of said leaf spring solidly through said top spring leaf to transfer loads and shocks from said leaf spring to said lever.

2. A suspension as claimed in claim 1, wherein said load and shock transfert means comprise:

a shackle having one end mounted on said lever and the opposite end mounted at the end of said top leaf, both ends of said shackle being mounted for pivotal movement about axes parallel to said second axis.

3. A suspension as claimed in claim 2, wherein said transmitting lever comprises:

an inverted U-shaped strap having a web and side flanges, said one end of said shackle being mounted on said side flanges and said balloon being fast with said web.

4. A shock-absorbing suspension for a road vehicle having a body, said suspension comprising:

a shock-absorbing assembly depending from the vehicle body;

a rocking beam mounted, between the ends thereof, to said assembly for rocking motion about a rock axis transverse to the body;

a first leaf spring having one end mounted on one end of said rocking beam for pivotal movement about a first axis parallel to said rock axis;

a first transverse wheel-axle beam solid with said first leaf spring;

a load and shock transmitting lever at the other end of said first leaf spring;

means mounting one end of said lever to the vehicle body for pivotal movement thereof about a second axis parallel to said rock axis;

a first pneumatic balloon solid with the other end of said lever and solid with the vehicle body, respectively;

load and shock transfer means on said lever and on said other end of said first leaf spring capable of transferring loads and shocks from said leaf spring to said lever;

a second leaf spring having one end mounted on the other end of said rocking beam for pivotal movement about a third axis parallel to said rock axis;

a second transverse wheel-axle beam solid with said second leaf spring; and means mounting the other end of said second leaf spring on the vehicle body for swinging motion of said second leaf spring about a fourth axis parallel to said rock axis.

5. A suspension as claimed in claim 4, wherein said shock absorbing assembly comprises:

an arm and means mounting one end of said arm to the vehicle body for pivotal movement about an axis parallel to said rock axis;

a second pneumatic balloon solid with the other end of said arm and solid with the vehicle body, respectively;

a bracket solid with and depending from said arm between the ends thereof; and means mounting said rocking beam, between the ends thereof, to the lower end of said bracket for pivotal movement about said rock axis.

6. A suspension as claimed in claim 5, wherein said load and shock transfer means comprise:

a load-bearing member on said lever; and a leaf at the top of said first leaf spring freely slidably applied against said load-bearing member.

7. A suspension as claimed in claim 6, wherein said load-bearing member is a freely rotatable roller.

8. A suspension as claimed in claim 7, wherein said transmitting lever comprises:

an inverted U-shaped strap having a web and side flanges, said roller being mounted on said side flanges and said balloon being fast with said web; said top leaf extending freely between said side flanges.

9. A suspension as claimed in claim 8, wherein the free end of said top spring leaf is bent downwardly, said transfer means further comprising a stop pin fixed to said flanges beneath said roller at a distance therefrom smaller than the length of the bent end of said top spring leaf for preventing withdrawal of said top leaf from said strap.

10. A suspension as claimed in claim 4, wherein said load and shock transfert means comprise:

a leaf at the top of said first leaf spring; and a shackle having one end mounted on said lever and the opposite end mounted at the end of said top leaf, both ends of said shackle being mounted for pivotal movement about axes parallel to said rock 11. A suspension as claimed in claim 10, wherein said transmitting lever comprises:

an inverted U-shaped strap having a web and side flanges, said one end of said shackle being mounted on said side flanges and said balloon being fast with said web.

12. A suspension as claimed in claim 4, wherein said pneumatic balloon comprises:

a hollow body having resilient sidewall means defining an air chamber;

heavy shock-absorbing resilient damper element within said chamber, free from said sidewall means and solid with said transmitting lever; said damper element projecting up into said chamber and terminating short of the vehicle body to define therebetween a stroke of short predetermined length;

wherein, upon light amplitude jolting due to road irregularities, the top of said damper element butts against the vehicle body and vibrations in the leaf spring are absorbed solely by said leaf spring whereas any low amplitude jolt is absorbed by said heavy damper element.

13. A suspension as claimed in claim 4, wherein said top spring leaf has a free end that is bent and wherein said transfer means further comprise a stop pin fixed to said flanges beneath said roller at a distance therefrom smaller than the length of the bent end of said top spring leaf for preventing withdrawal of said top leaf from said strap.

14. A shock-absorbing suspension for a road vehicle having a body, said suspension comprising:

a transverse wheel-axle beam;

a leaf spring having a top spring leaf;

means making said beam and said spring solid with one another;

means connecting one end of said top spring leaf to the vehicle body for pivotal movement of said leaf spring about a first axis extending transversely of said vehicle body;

a load and shock transmitting lever at the other end of said leaf spring;

means mounting one end of said lever to the vehicle body for pivotal movement thereof about a second axis parallel to said first axis;

a pneumatic balloon solid with the other end of said lever and with the vehicle body, said pneumatic balloon comprising:
  (a) a hollow body having resilient sidewall means defining an air chamber;
  (b) a heavy shock-absorbing resilient damper element within said chamber, free from said sidewall means and solid with said transmitting lever; said damper element projecting up into said chamber and terminating short of the vehicle body to define therebetween a stroke of short predetermined length;
  (c) wherein both high amplitude jolting due to road irregularities, the top of said damper element butts against the vehicle body and vibrations in the leaf spring are absorbed essentially by said leaf spring whereas any low amplitude jolt is absorbed by said heavy damper element; and load and shock transfer means interconnecting said lever and said other end of said leaf spring solidly through said top spring leaf to transfer loads and shocks from said leaf spring to said lever, said load and shock transfer means comprising:
  (a) a freely rotatable roller load-bearing member on said lever;
  (b) wherein said top spring leaf is freely slidably applied against said load-bearing member;
  (c) wherein said transmitting lever comprises:
    an inverted U-shaped strap having a web and side flanges, said roller being mounted on said side flanges and said balloon being fast with said web; said top leaf extending freely between said side flanges.

* * * * *